US007380214B1

(12) United States Patent
Giormov

(10) Patent No.: US 7,380,214 B1
(45) Date of Patent: May 27, 2008

(54) GRAPHICAL USER INTERFACE WITH AN ERROR REPORTING SYSTEM

(75) Inventor: Dimitar T. Giormov, Plovdiv (BG)

(73) Assignee: SAP AG, Walldorf (DE)

( * ) Notice: Subject to any disclaimer, the term of this patent is extended or adjusted under 35 U.S.C. 154(b) by 714 days.

(21) Appl. No.: 10/835,752

(22) Filed: Apr. 29, 2004

(51) Int. Cl.
  *G06F 3/00* (2006.01)
  *G06F 9/44* (2006.01)
(52) U.S. Cl. .................... 715/772; 715/705; 715/763; 715/804; 715/967; 717/125; 717/174
(58) Field of Classification Search ............ 715/772, 715/705, 763, 804, 967
  See application file for complete search history.

(56) References Cited

U.S. PATENT DOCUMENTS

| | | | | |
|---|---|---|---|---|
| 5,493,658 | A | * | 2/1996 | Chiang et al. .............. 715/709 |
| 5,544,360 | A | | 8/1996 | Lewak |
| 5,781,191 | A | * | 7/1998 | Mayuzumi et al. ......... 715/705 |
| 5,966,702 | A | | 10/1999 | Fresko et al. |
| 6,282,698 | B1 | | 8/2001 | Baker et al. |
| 6,593,940 | B1 | * | 7/2003 | Petersen et al. ............ 715/700 |
| 6,772,408 | B1 | | 8/2004 | Velonis et al. |
| 6,836,889 | B1 | | 12/2004 | Chan et al. |
| 6,915,461 | B1 | * | 7/2005 | Watanabe .................... 714/57 |
| 2003/0081003 | A1 | * | 5/2003 | Kutay et al. ................ 345/762 |
| 2003/0110469 | A1 | * | 6/2003 | Jackson ...................... 717/113 |
| 2004/0015783 | A1 | | 1/2004 | Lennon et al. |
| 2004/0015856 | A1 | | 1/2004 | Goward et al. |
| 2004/0237028 | A1 | * | 11/2004 | Softky ..................... 715/501.1 |
| 2004/0261030 | A1 | * | 12/2004 | Nazzal ....................... 715/738 |
| 2005/0166148 | A1 | * | 7/2005 | Garding ...................... 715/708 |
| 2005/0166189 | A1 | | 7/2005 | Ma |

OTHER PUBLICATIONS

"6570P093 Notice of Allowance mailed Oct. 17, 2007 for U.S. Appl. No. 10/836157", (Oct. 17, 2007).
"6570P093 Office Action mailed Apr. 23, 2007 for U.S. Appl. No. 10/836157", (Apr. 23, 2007).
"User's Guide iPlant Application Server Integration for VisualCafe", (Nov. 2000).
Arni, Faiz , et al., "Commercial Component Creation (EJB 2.0)", *Enterprise JavaBeans Components Technology Based Components*, (Apr. 5, 2001).

(Continued)

*Primary Examiner*—Sy D. Luu
(74) *Attorney, Agent, or Firm*—Blakely Sokoloff Taylor & Zafman

(57) ABSTRACT

According to one aspect of the invention, a graphical user interface is provided. The graphical user interface comprises a first window displaying a representation of a component available for use by a software application and a second window displaying information regarding an error related to the component if an error is experienced. The second window may comprise a first error window displaying identification of the error, a second error window displaying information regarding the nature of the error, and a third error window displaying information to assist a user in correcting the error. The error may be an error in locating the component, an error in loading a class file associated with the component, or an exception. When the error is an exception, the second window may further comprise a fourth error window displaying information regarding the exception.

30 Claims, 12 Drawing Sheets

OTHER PUBLICATIONS

Flanagan, D., "Java Examples in a Nutshell", *O'Reilly,* (1997), 20 and 153.

Giormov, Dimitar T., et al., "A graphical user interface with a background class loading event system,", U.S. Appl. No. 10/835,750, Filed Apr. 29, 2004.

Grundy, J., "Storage and Retrieval of Software Components Using Aspects", *Computer Science Conference, ACSC 2000, 23rd Australian,* (2000), 95-102.

Inprise Corporation, "Enterprise JavaBeans Programmer's Guide, Version 4.5", Chapter 7, (2000, 2001), 91-150.

\* cited by examiner

GRAPHICAL USER INTERFACE WITH AN ERROR REPORTING SYSTEM

BACKGROUND OF THE INVENTION

1). Field of the Invention

This invention relates to a method and graphical user interface for displaying errors associated with the development or deployment of a software application.

2). Discussion of Related Art

Classfiles in Object Oriented Environments

Certain software technologies, including Java, are "object oriented." According to an object oriented approach, the subject matter that is processed by a computer program is organized into classes of likeness. For example, the software used to sell items to customer X might belong to the same class of software (e.g., a class named "sales") that is used to sell items to customer Y. Here, given that a significant degree of overlap is expected to exist regarding the methods and data types used to process sales for both customers X and Y (e.g., an "update billing about sale" method, an "update accounting about sale" method, a "part number" data type, a "quantity" data type . . . etc.) it is deemed more efficient to organize such methods and data types into a generic "sales" class from which specific instances of the class (e.g., an instance for selling to customer X and an instance for selling to customer Y) can be defined and created.

Each specific instance of a class is referred to as an object, and each object assumes, or inherits, the characteristics of the class from which it is defined. The characteristics of a class may be referred to as items within the class or particular syntaxes written into the software code. Thus, a first object could be created from the generic sales class to create a "sell to customer X" object; and, a second object could be created from the generic sales class to create a "sell to customer Y" object. Both objects would be able to execute the methods defined by the class. For example, the "sell to customer X" object could execute the "update accounting about sale" method to update an accounting department about a sale to customer X; and, the "sell to customer Y" object could also execute the "update accounting about sale" method to update an accounting department about a sale to customer Y.

In general, the runtime execution of any computer program can be viewed as the execution of a sequence of methods. With respect to an object-oriented approach, such a sequence of methods can be implemented by calling upon a sequence of objects and invoking one or more methods at each object. In order to invoke the method of an object, a representation of the object is typically created beforehand. In virtual machine-based object-oriented software environments, classfiles are bytecode level data structures from which such representations are created. A classfile can be viewed as a bytecode level description of a class; and, therefore, a classfile can be used as a template for the formation of an object, at the bytecode level, that is a member of the class. As specific methods can be attributed to specific classes, each classfile is made to contain the sequence of bytecode instructions that correspond to each of the class's specific methods.

Component Based Architectures

Component based software environments use granules of software (referred to as "components" or "component instances") to perform basic functions. The components themselves typically comprise one or more software objects. Some examples of component based architectures include Java Beans (JB), Enterprise Java Beans (EJB), Common Object Request Broker Architecture (CORBA), Component Object Model (COM), Distributed Component Object Model (DCOM) and derivatives there from.

The functional granularity offered by a plurality of different components provides a platform for developing a multitude of more comprehensive tasks. For example, a business application that graphically presents the results of calculations made to an individual's financial records (e.g., amortization of interest payments, growth in income, etc.) may be created by logically stringing together: 1) an instance of a first component that retrieves an individual's financial records from a database; 2) an instance of a second component that performs calculations upon financial records; and, 3) an instance of a third component that graphically presents financial information.

Moreover, within the same environment, another business application that only graphically presents an individual's existing financial records may be created by logically stringing together: 1) another instance of the first component mentioned just above; and, 2) another instance of the third component mentioned above. That is, different instances of the same component may be used to construct different applications. The number of components within a particular environment and the specific function(s) of each of the components within the environment are determined by the developers of the environment.

Components may also be created to represent separate instances of persistent data (e.g., a first component that represents a first row of database information, a second component that represents a second row of database information, etc.), and text pages or servlets for web based invocation of specific business methods.

Development Issues

In a Java environment, "deployment descriptors" are used, among other things, to facilitate the interaction between different components so that the components themselves need not be changed to call upon or use other components. The deployment descriptors include what are known as "references." The references indicate how one component will interact with another component using interfaces on the components.

When an application is assembled, certain information must be put into the deployment descriptors. For example, setting the deployment descriptors with the "main" class files of the components. For example, a bean always has a bean class, which holds the implementation of the bean's interfaces (local and remote), which are used for communication with other components. If the wrong class file is specified, or a class file that does not actually exist is specified, the software application cannot not be built.

FIG. 1 illustrates a prior art graphical user interface (GUI) 30 used in the deployment (or development) of a component based software applications. The GUI 30 includes utility pull down menus 32, utility buttons 34, and tabs 34. Within the displayed tab 36 are a component window 38 and a component information window 40. The component information window 40 includes a component name indicator 42, a remote interface field 44, home interface field 46, a component class field 48, a primary key class field 50, a primary key field 52, a reentrant indicator 54, and a persistent management indicator 56.

If the user wished to verify, or enter, the name of a class file used to create a particular instance of a particular component (e.g., its interface), he or she had to manually type the name of the class file into the appropriate field. The GUI responded positively only if the typed name was "correct." Because the names of the class files can be very long and confusing, often the developer would type in an incorrect name, and the GUI would not provide any information as to what the correct name was.

SUMMARY OF THE INVENTION

The invention provides a graphical user interface. The graphical user interface comprises a first window displaying a representation of a component available for use by a software application and a second window displaying information regarding an error related to the component if an error is experienced. The second window may comprise a first error window displaying identification of the error, a second error window displaying information regarding the nature of the error, and a third error window displaying information to assist a user in correcting the error. The error may be an error in locating the component, an error in loading a class file associated with the component, or an exception. When the error is an exception, the second window may further comprise a fourth error window displaying information regarding the exception.

BRIEF DESCRIPTION OF THE DRAWINGS

The invention is described by way of example with reference to the accompanying drawings, wherein.

DETAILED DESCRIPTION OF THE INVENTION

An improvement is to visually present the user with correct class names. FIG. 2 through FIG. 5D illustrate a method for searching for a particular type of class file and a graphical user interface for displaying the names of the class files of the particular type. A first class file is searched for a particular feature. If the class file contains the feature, the name of the class file is displayed. A second class file may then be searched and its name displayed if it contains the same feature. The names of all class files having the feature may then be displayed in a menu on the graphical user interface. The graphical user interface may also include a window displaying a list of features. When one of the features is selected, the names of all the class files having the feature are displayed in the menu.

Figure 1:
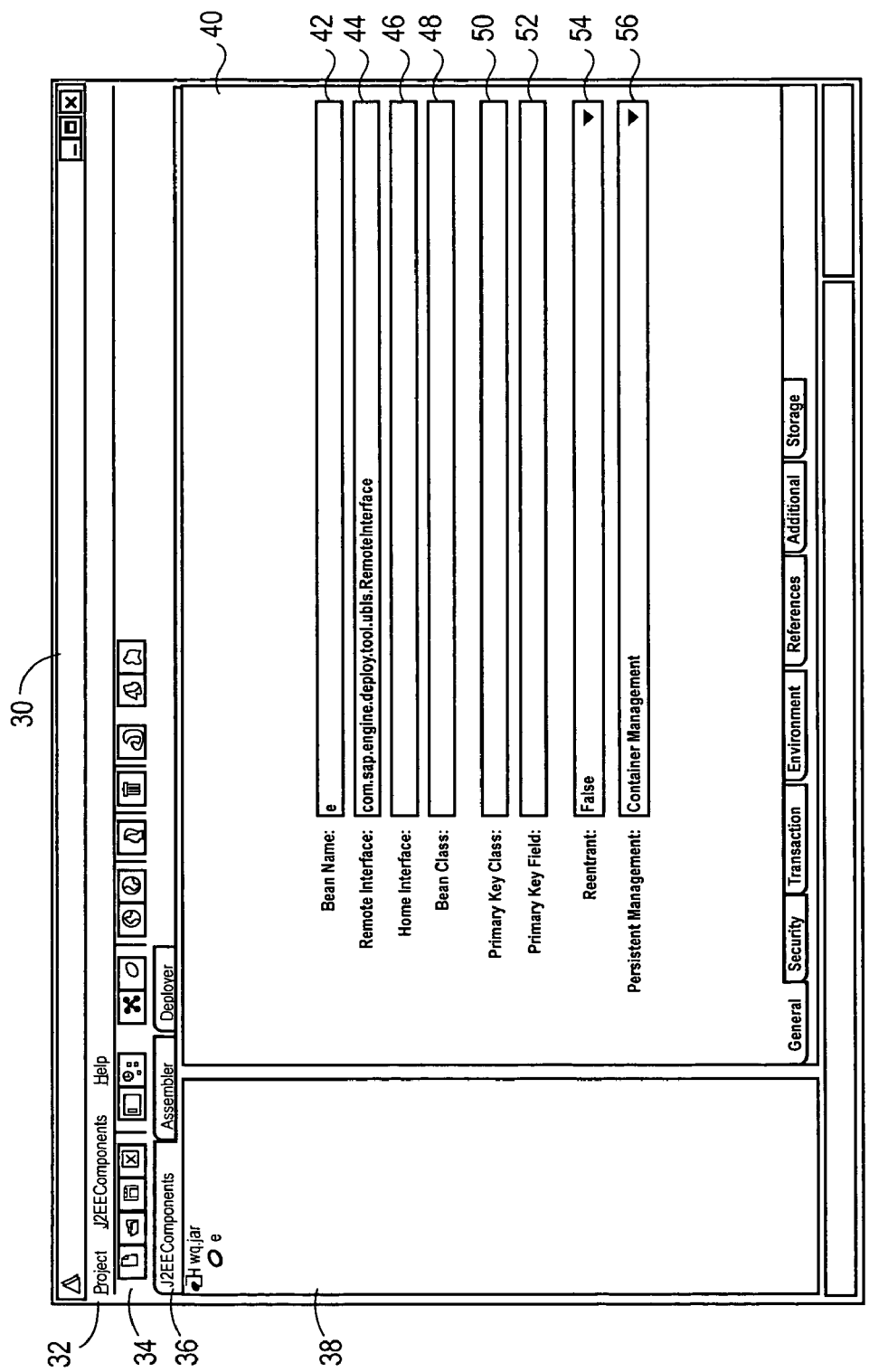
FIG. 1 illustrates a prior art graphical user interface.
Figure 2:
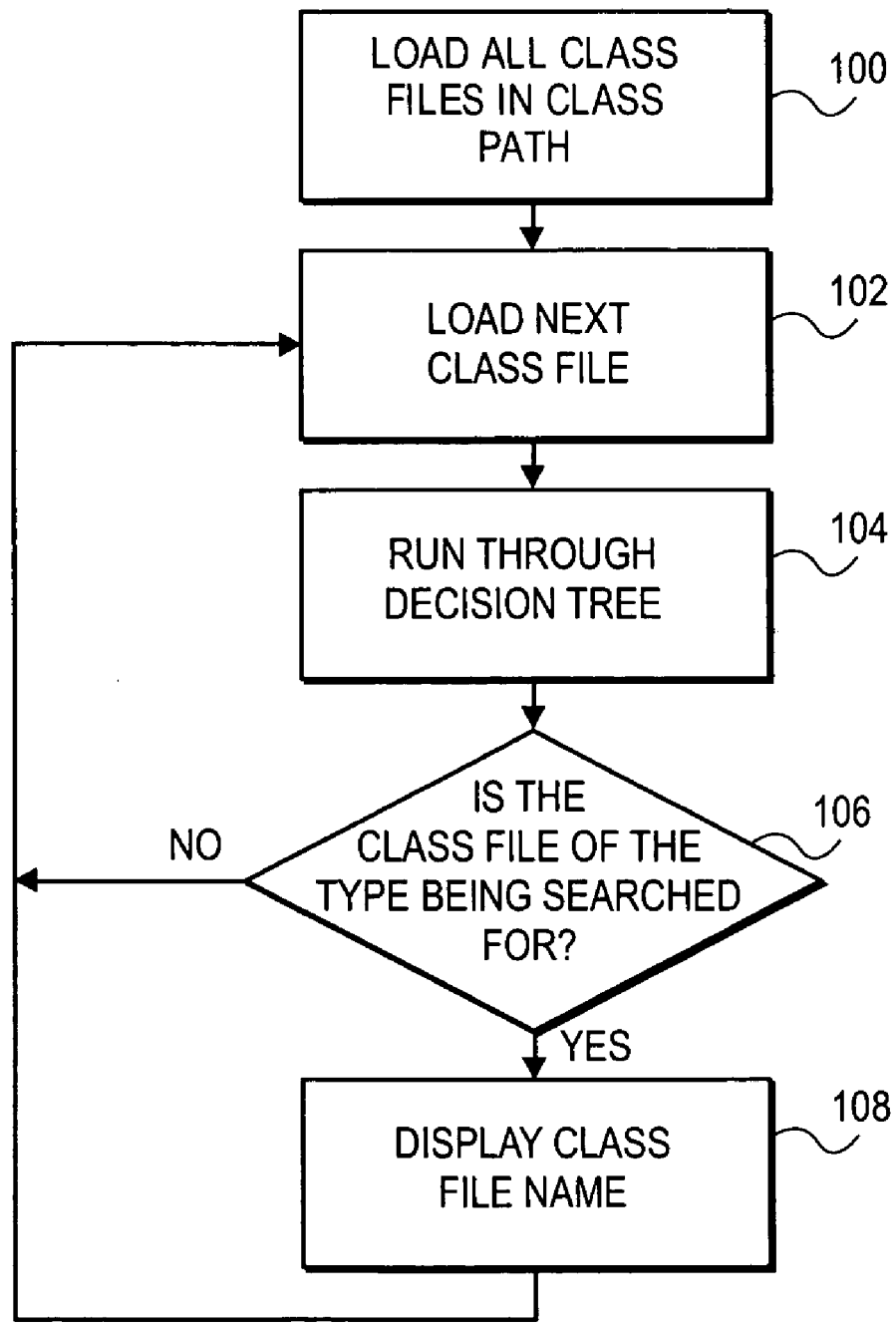
FIG. 2 is a flow chart illustrating a method in accordance with the present invention.

FIG. 2 illustrates a method for filtering through class files in a project to identify the names of the class files of a particular type. A "type of class file" is a class file that produces a particular type of object (e.g., a component object, a remote interface object, a local interface object, a primary key object, etc.). First, at methodology 100, all class files in the class path are located and their location recorded. Then, at methodology 102 a first class file is loaded.

Next, at methodology 104 a decision tree is executed to determine whether or not the currently loaded class file is one of the types being searched for. At methodology 106, the decision is made whether or not the currently loaded class file is of the searched for type. If the class file is of the type being searched for, the name of the class file is displayed as illustrated by methodology 108.

If the class file is not of the type being searched for, the class file name is not displayed. Alternatively it could be displayed but in a category that does not have any special requirements. The process returns to methodology 102 until all class files have been loaded and searched. The pool of class files to be searched may vary from embodiment to embodiment. For example, in one embodiment all class files within a project may be searched. In another embodiment, all class files that are related to a particular component may be searched (e.g., those class files whose methods could be used by the component, those class files whose data items could used by the component, etc.).

Figure 3:
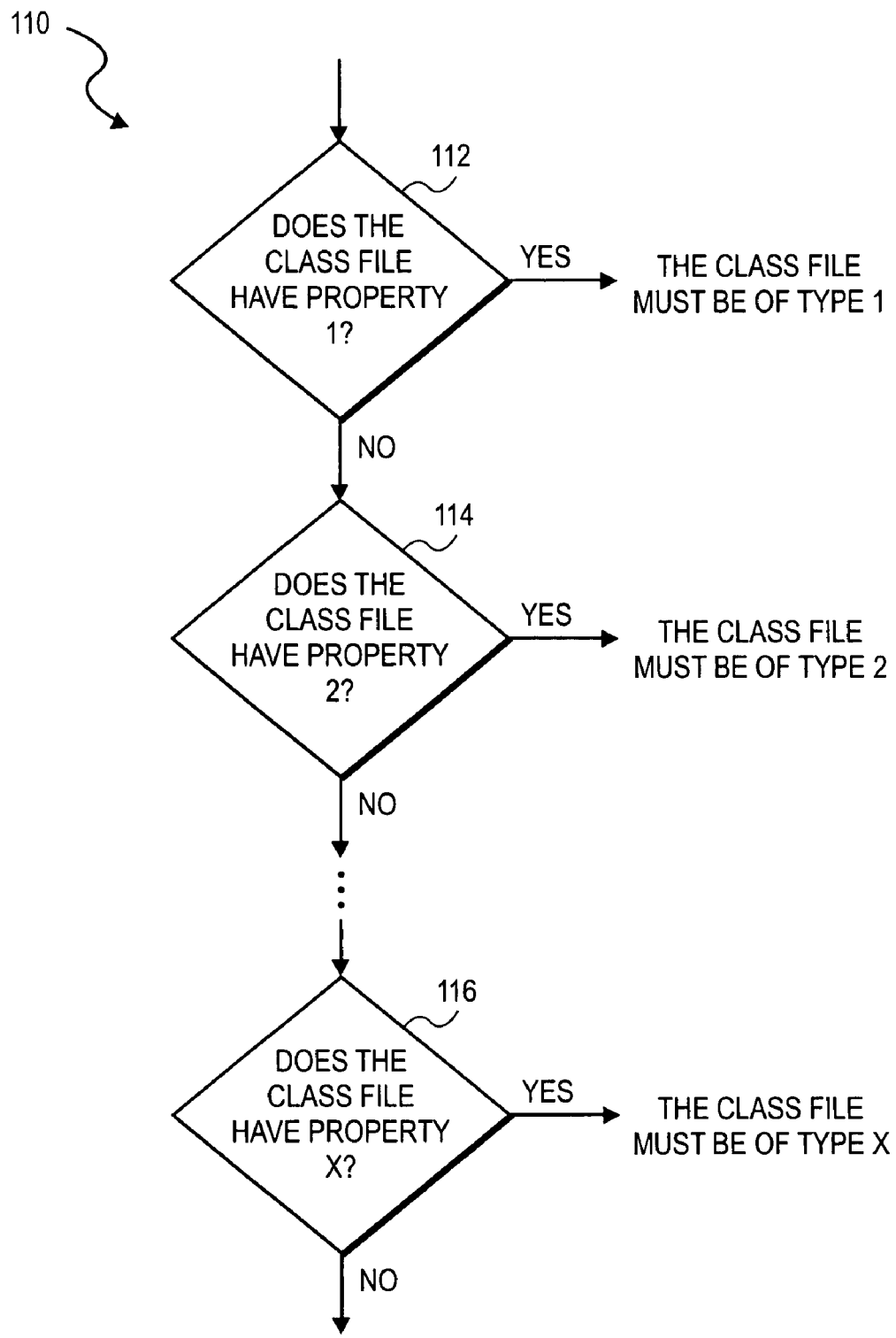
FIG. 3 is a flow chart illustrating a decision tree in accordance with the present invention.

FIG. 3 illustrates a decision tree 110 which may be implemented in methodology 102 in FIG. 2. The decision tree 110 includes multiple methodologies 112, 114, and 116, each of which searches the current class file for a particular property. If the class file includes the property associated with a particular type of class file, the decision is made that the class file must be of that type. As illustrated in FIG. 3, at methodology 112 the class file is searched for "property 1." If the class file has property 1, it is decided that the class file must be of type 1, which is associated with property 1. That is, all class files of type 1 must include property 1.

If the class file does not have property 1 the decision tree 110 then moves to methodology 114. At methodology 114, the class file is searched for "property 2." If the class file has property 2, then the decision is made that the class file must be of type 2, which is associated with property 2. If the class file does not have property 2, then the decision tree 110 moves on to the next methodology.

As illustrated in FIG. 3, the decision tree may include up to X decision methodologies with the generic methodology 116 searching a class file for a generic "property X." If the class file includes property X, then the decision is made that the class file must be of type X, which is associated with property X. Upon execution of the decision tree, the class file is either characterized as being one of the X types (and if so—which one) or is understood to not be any one of the X types (e.g., it could be of a type which does not have any special requirements except not being one of the X type); or, characterized within a category that does not include any special requirements.

Figure 4:
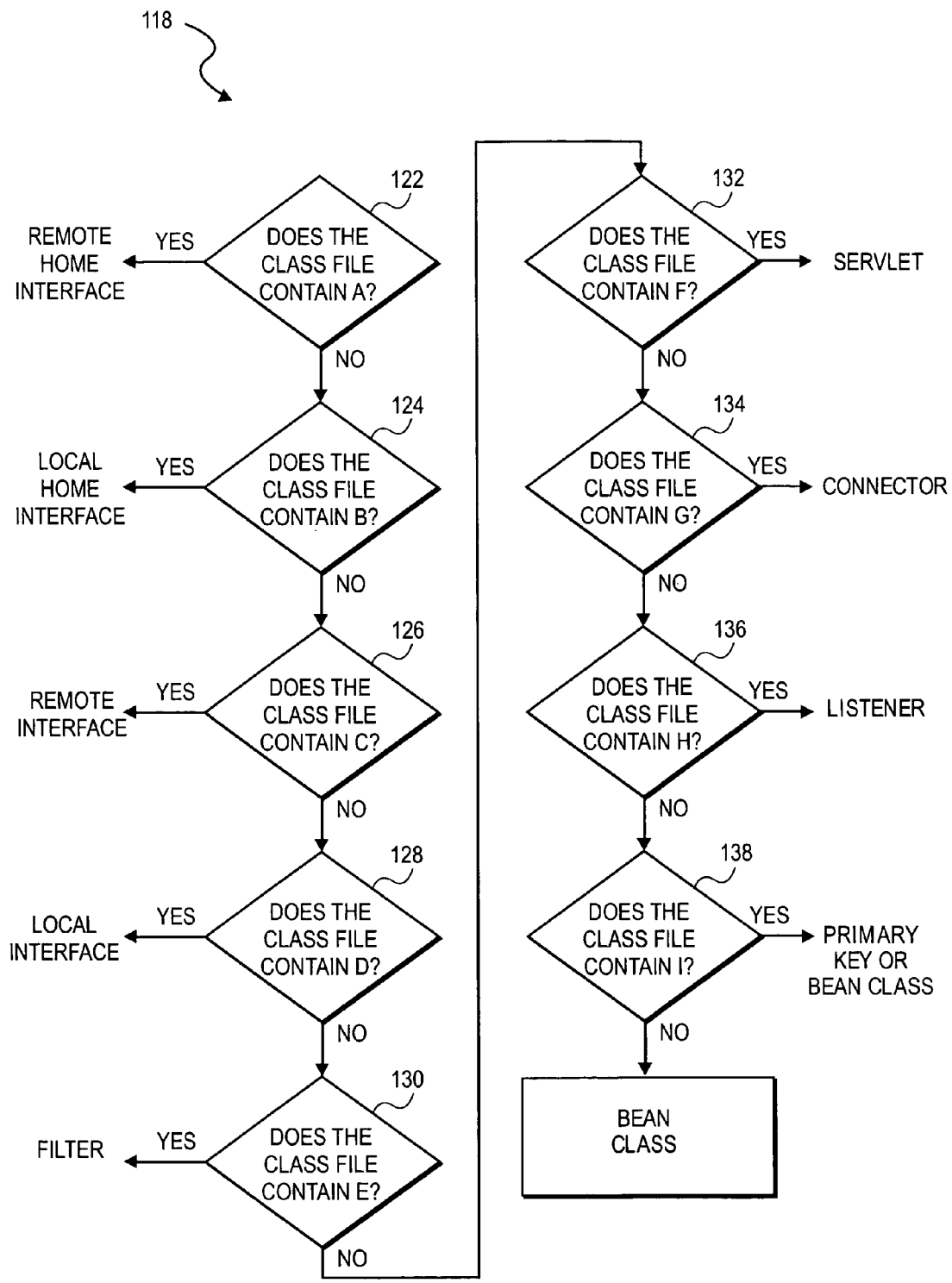
FIG. 4 is a flow chart illustrating a decision tree according to a specific embodiment of the present invention.

FIG. 4 illustrates a decision tree 118 according to a specific embodiment. The decision tree 118 includes nine methodologies, 122-138, each of which searches the current class file for a particular property that it inherits (e.g., which corresponds to a feature that an object instantiated from it will inherit). Table 1, listed below, lists the particular class file types and an associate class file inheritance that identifies it as being of its specific type. The specific embodiment of Table 1 corresponds to an Enterprise Java Beans (EJB) environment.

TABLE 1

| Class File Type: | Class File Inherits: |
|---|---|
| Remote Home Interface | "javax.ejb.EJBHome" (Item A) |
| Local Home Interface | "javax.ejb.EJBLocalHome" (Item B) |
| Remote Interface | "javax.ejb.EJBObject" (Item C) |

TABLE 1-continued

| Class File Type: | Class File Inherits: |
|---|---|
| Local Interface | "javax.ejb.EJBLocalObject" (Item D) |
| Filter | "javax.servlet.Filter" (Item E) |
| Servlet | "javax.servlet.http.HttpServlet" or "javax.servlet.Servlet" (Item F) |
| Connector | "javax.resource.ResourceAdapter" (Item G) |
| Listener | "javax.servlet.ServletContextListener" (Item H) |
| Primary Key | "Java.ioSerializible" (Item I) |
| Bean Class | None of A through H |

Referring again to FIG. 4, at methodology 122, it is determined whether or not the class file contains item A in Table 1. If the class file contains item A in Table 1, the class file is of the type that produces a remote home interface object. If the class file does not contain item A, then the class file is not of the type that produces a remote home interface object, and the decision tree moves to methodology 124.

At methodology 124, it is determined whether or not the class file contains item B in Table 1. If the class file contains item B, in Table 1, the class file is of the type that produces a local home interface object. If the class does not contain item B, in Table 1, the class file is not of the type that produces a local home interface object, and the decision tree 118 moves on to methodology 126.

At methodology 126, it is determined whether or not the class file contains item C in Table 1. If the class file contains item C in Table 1, then the class file is of the type that produces a remote interface object. If the class file does not contain item C in Table 1, then the class file is not of the type that produces a remote interface, and the decision tree 118 moves on to methodology 128.

At methodology 128, it is determined whether or not the class file contains item D in Table 1. If the class file contains item D in Table 1, then the class file is of the type that produces a local interface object. If the class file does not contain item D in Table 1, the class file is not of the type that produces a local interface object, and the decision tree 118 moves on to methodology 130.

At methodology 130 it is determined whether or not the current class file contains item E in Table 1. If the class file contains item E in Table 1, then the class file is of the type that produces a filter object. If the class file does not contain Item E in Table 1, then the class file is not of the type that produces a filter object, and the decision tree 118 moves on to methodology 132.

At methodology 132, it is determined whether or not the class file contains item F in Table 1. If the class file contains item F in Table 1, then the class file is of the type that produces a servlet object. If the class file does not contain item F in Table 2, then the class file is not of the type that produces a servlet object, and the decision tree 118 moves on to methodology 134.

At methodology 134, it is determined whether or not the class file contains item G in Table 1. If the class file contains item G in Table 1, then the class file is of the type that produces a connector object. If the class file does not contain item G in Table 1, then the class file is not of the type that produces a connector object, and the decision tree 118 moves on to methodology 136.

At methodology 136, it is determined whether or not the class file contains item H in Table 1. If the class file contains item H in Table 1, then the class file is of the type that produces a listener object. If the class file does not contain item H in Table 1, then the class file is not of the type that produces a listener object, and the decision tree 118 moves on to methodology 138.

At methodology 138, it is determined whether or not the class file contains item I in Table 1. If the class file contains item I in Table 1, then the class file is of the type that produces a primary key object or a bean class. If the class file does not contain item I in Table 1, then the class file is a not of the type that produces a primary key object, but it still could be a bean class object.

Thus, a software application utilizing the methods described above may filter, or search, through multiple class files and, for each class file, identify whether or not the class file is of a type that produces a particular kind of object. Note that other embodiments may differ from the strictly consecutive sequential tree structure of FIGS. 3 and 4. That is, alternative tree structures may split into separate branches.

FIGS. 5A-5D illustrate a graphical user interface (GUI) 150, according to an embodiment of the present invention. Although the GUI 150 of FIGS. 5A-5D is specific to a J2EE project, those of ordinary skill in the art will be able to associate the teachings herein to other environments.

Figure 5A:
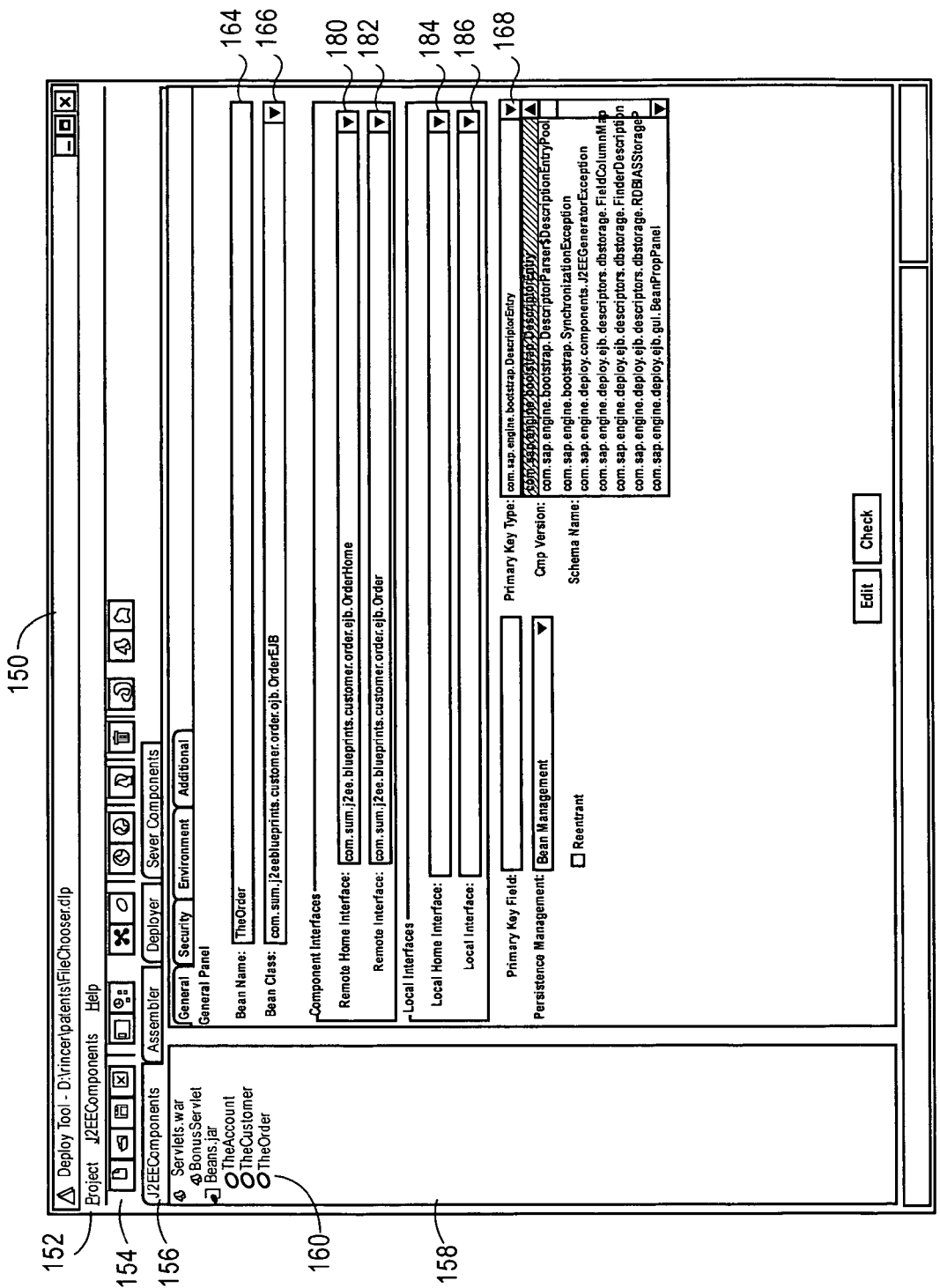
FIGS. 5A-5D illustrate a graphical user interface according to an embodiment of the present invention.

Referring specifically to FIG. 5A, the GUI 150 includes utility pull down menus 152, utility buttons 154, and tabs 156. The utility pull down menus 152 are displayed at an upper portion of the GUI 150 and include three pull down menus: a Project pull down menu, a J2EE Components pull down menu and a Help pull down menu. Although not illustrated, it should be understood that each of the utility pull down menus 152 include those items which may be used for performing various functions utilizing the GUI 150 (e.g., creating a new project, saving the current project, deleting a project, etc.).

The utility buttons 154 are arranged horizontally below the utility pull down menus 152 and include multiple buttons for performing various functions of the software application. The various functions performed by the utility buttons 154 may be to support some of the functions contained within the utility pull down menus 152 (e.g., opening a file to create a new project, opening a file to save the current project, etc.).

The tabs 156 are grouped in a horizontal row just below the utility buttons 154 and include a J2EE Components tab, an Assembler tab, a Deployer tab and Server Components tab. In the examples illustrated in FIGS. 5A-5D, the J2EE Components tab is selected, or opened, and the contents thereof are displayed in the remainder of the GUI 150 below the tabs 156.

The J2EE Components tab includes a component window 158, which displays the various components 160 in the current project and a component information window 162. The component window 158 stretches along a side edge of the GUI 150 and extends the entire height of the J2EE Components tab. The component information window 162 occupies the remainder in the space of the J2EE Components tab.

In use, a user utilizes the GUI 150 to view the names for all class files of a particular type that are related to a particular component or servlet.

Referring specifically to FIG. 5A, the components 160 within the current project are listed in the component window 158. In the example illustrated two archived files, "Servlets.war" and "Beans.jar," are listed in the component window 158. The Servlets.war file further includes a servlet, "BonusServlet." The Beans.jar file further includes three beans (recalling that the term "bean" is used for "component" in J2EE environments), "The Accounts," "The Customer," and "The Order." As illustrated the user has selected The Order bean in the component window 158. As illustrated in FIG. 5A, various information about the selected component is displayed in the component information window 162. The name of the selected bean is listed in a bean name field 164. Of particular interest, is a bean class pull down menu 166, a primary key type pull down menu 168, a remote home interface pull down menu 180, a remote interface pull down menu 182, a local home interface pull down menu 184, and a local interface pull down menu 186.

When the project is created or the class path is changed the software application utilizing the GUI begins to search, using the methods described in FIGS. 2-4, through all of the class files within the project that are related to the selected component. The search is performed in the "background" so the user may continue to work without waiting for all the class files to be checked. All of the class files that inherit a searched for property are then displayed as part of the particular pull down menu 166, 168, 180, and 186 that has been selected that corresponds to the searched for property.

Therefore, in order to check, or enter, an appropriate class file, the user simply needs to refer to the displayed names. Conceivably, the user could also cut a specific name from the displayed list and paste it somewhere else rather than type it manually. The software application utilizing the GUI 150 may implement the method illustrated in FIGS. 2-4 to list the appropriate class files in the primary key type pull down menu 168. That is, the software application may utilize the above-described methods to classify types of class files.

As illustrated in FIG. 5A, after the bean component has been selected from the component window 158, activation of the primary key pull down menu 168 causes a list of all the class files associated with or related to the primary key to be displayed in the primary key pull down menu 168.

Although not illustrated, it should be understood that the bean class pull down menu 166 may be activated, and the software application utilizing the GUI 150 will show all class files which do not inherit items A, B, C, D, E, F, G, or H.

Figure 5B:
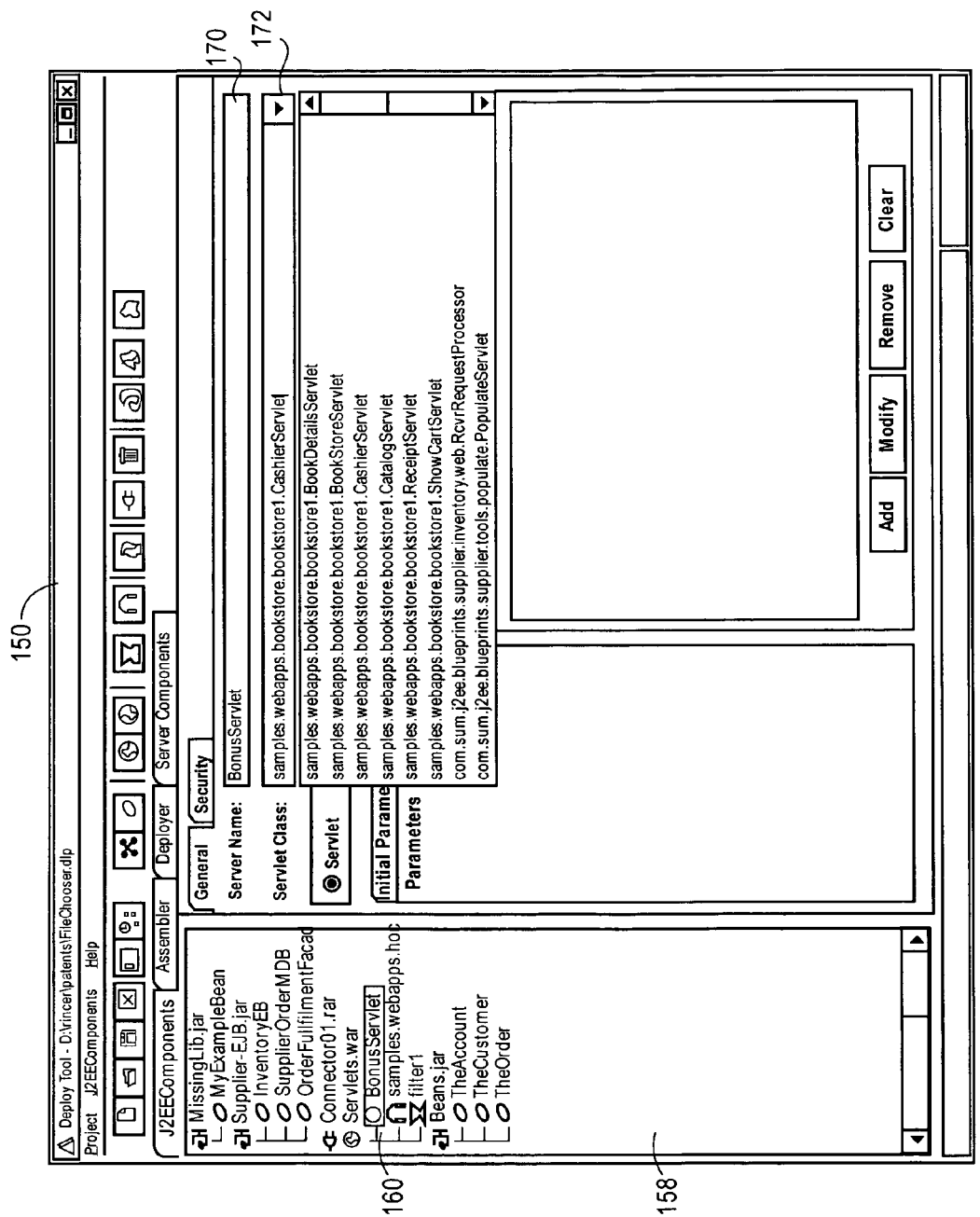

FIG. 5B illustrates the GUI 150 after the user has selected a servlet from the components 160 within the component window 158. As illustrated, various information about the selected servlet is displayed in the component information window 162. The servlet name is listed in a servlet name field 170. Additionally, the component information window 162 includes a servlet class pull down menu 172. As illustrated, when activated, the servlet class pull down menu 172 includes a list of all the class files within the project that are related to the selected pull down menu (i.e., servlets). The class files related to servlets are searched and filtered in a manner similar to that illustrated in FIG. 5A (i.e., using the methods illustrated in FIGS. 2-4).

Again, in order to check, or enter, an appropriate class file name, the user simply needs to refer to the displayed names, rather than typing the name manually.

Figure 5C:
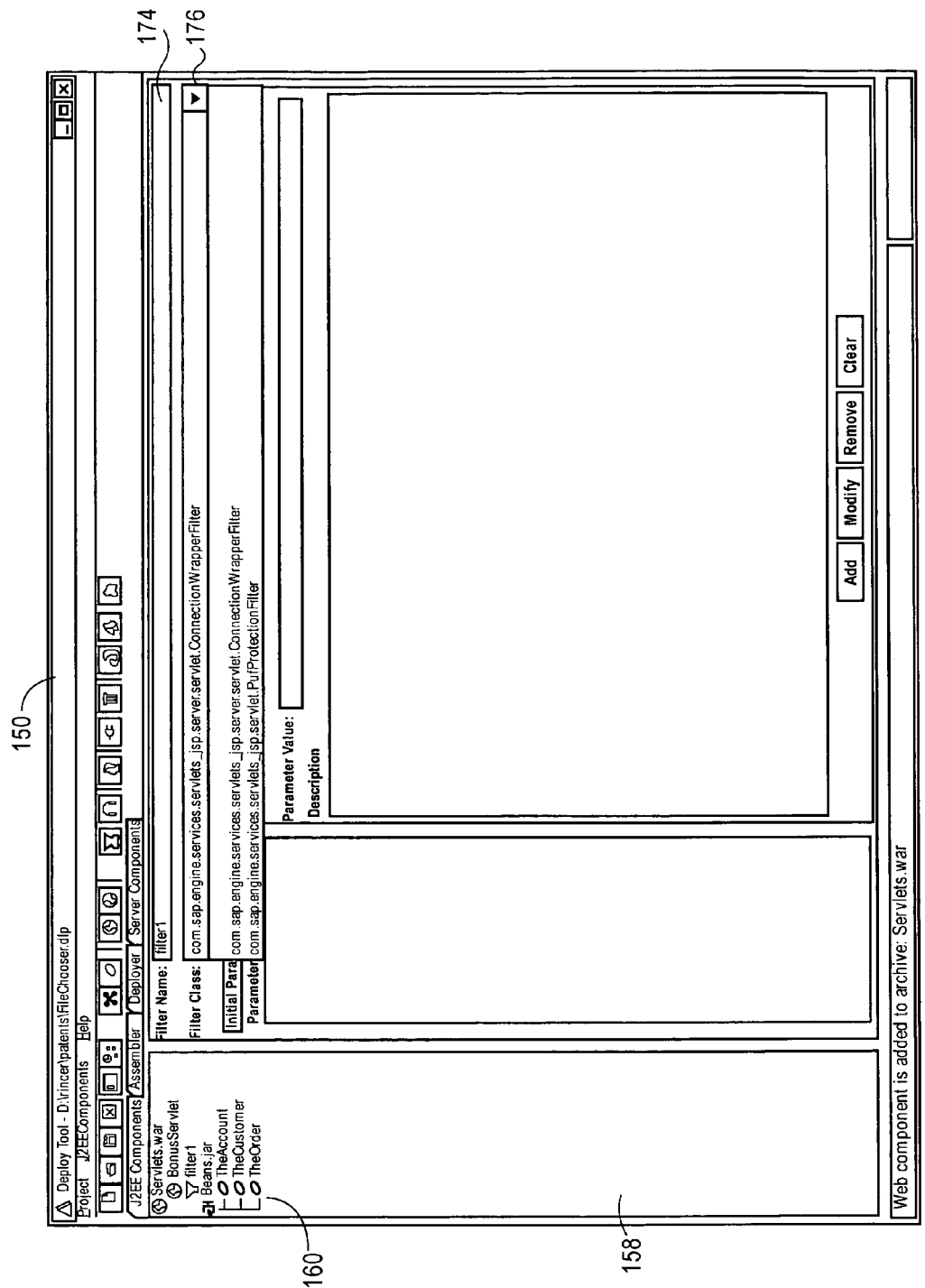

FIG. 5C illustrates the GUI 150 when a filter has been selected from the component window 158. Various information about the selected filter is listed within the component information window 162. With the filter selected, the component information window 162 includes a filter name field 174 and a filter class pull down menu 176. The name of the filter is displayed in the filter name field 174, and when activated, the filter class pull down menu 176 list the names, or addresses, of all the class files within the current project that are associated with, or related to, the selected pull down menu (i.e., filters). The class files related to filters are searched and filtered in manner similar to those illustrated in FIGS. 5A and 5B.

Again, in order to check, or enter, an appropriate class file name, the user simply needs to refer to the displayed names, rather than typing the name manually.

Figure 5D:
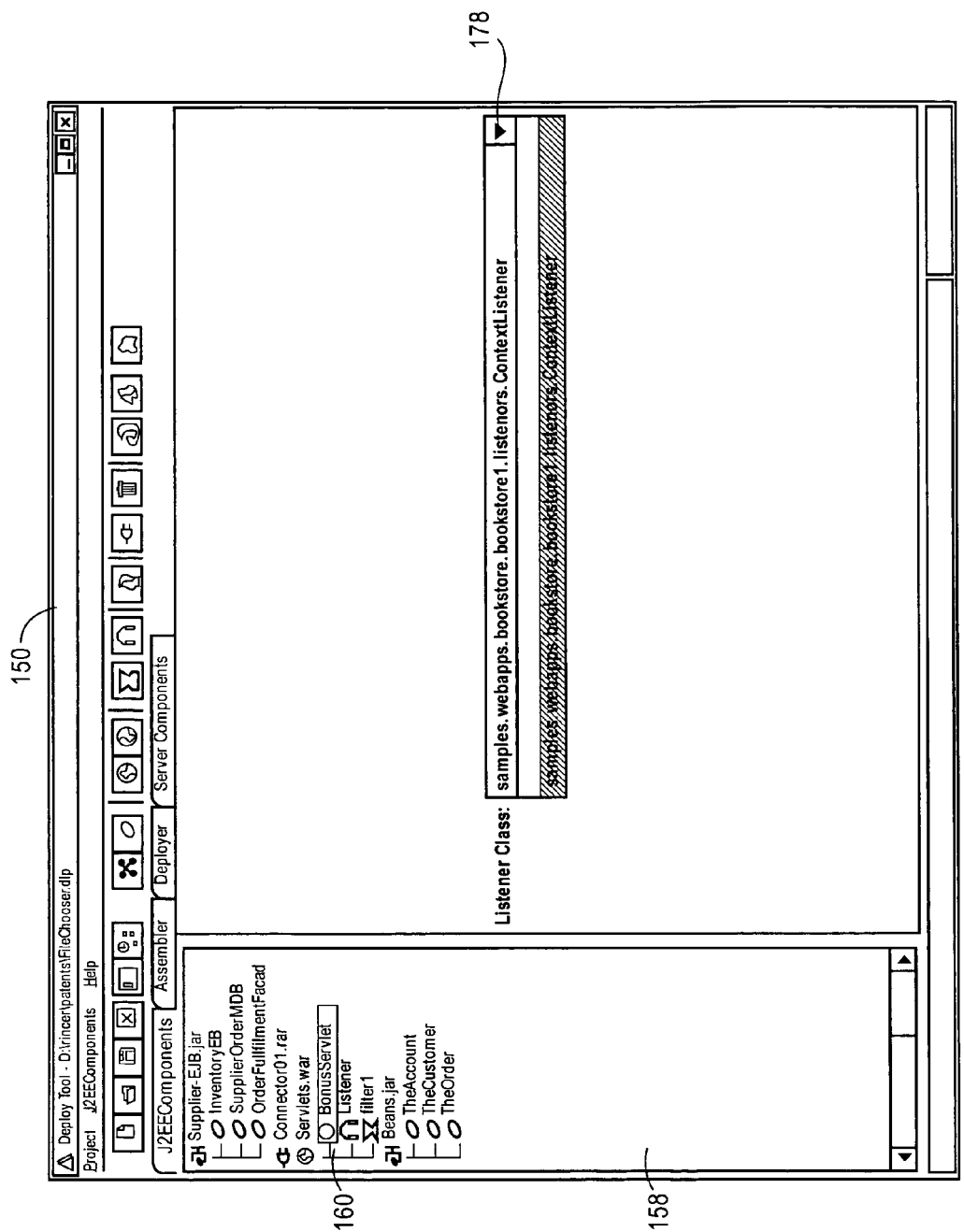

FIG. 5D illustrates the GUI 150 when a listener object has been selected from the components and objects 160 within the component window 158. As illustrated, when the listener object is selected from the component window 158, a listener class pull down menu 178 is displayed within the component information window 162. When activated, the listener class pull down menu 178 list the names, or addresses, of all the class files within the current project that are associated with, or related to, the selected pull down menu (i.e., listeners). The class files related to listeners are searched and filtered in manner similar to those illustrated in FIGS. 5A, 5B, and 5C.

Figure 6A:
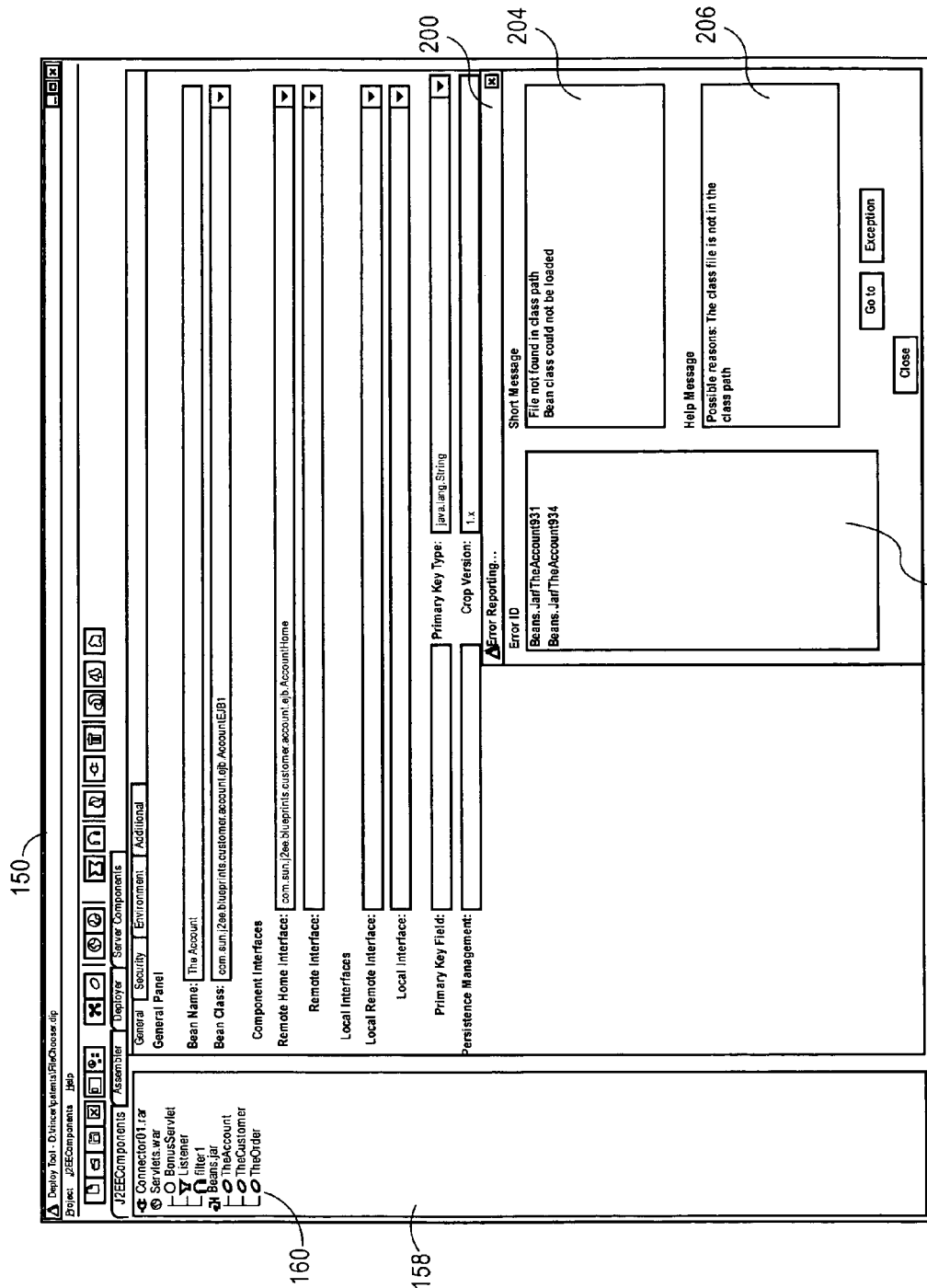
FIGS. 6A-6C illustrate the graphical user interface including an error reporting window.
Figure 6B:
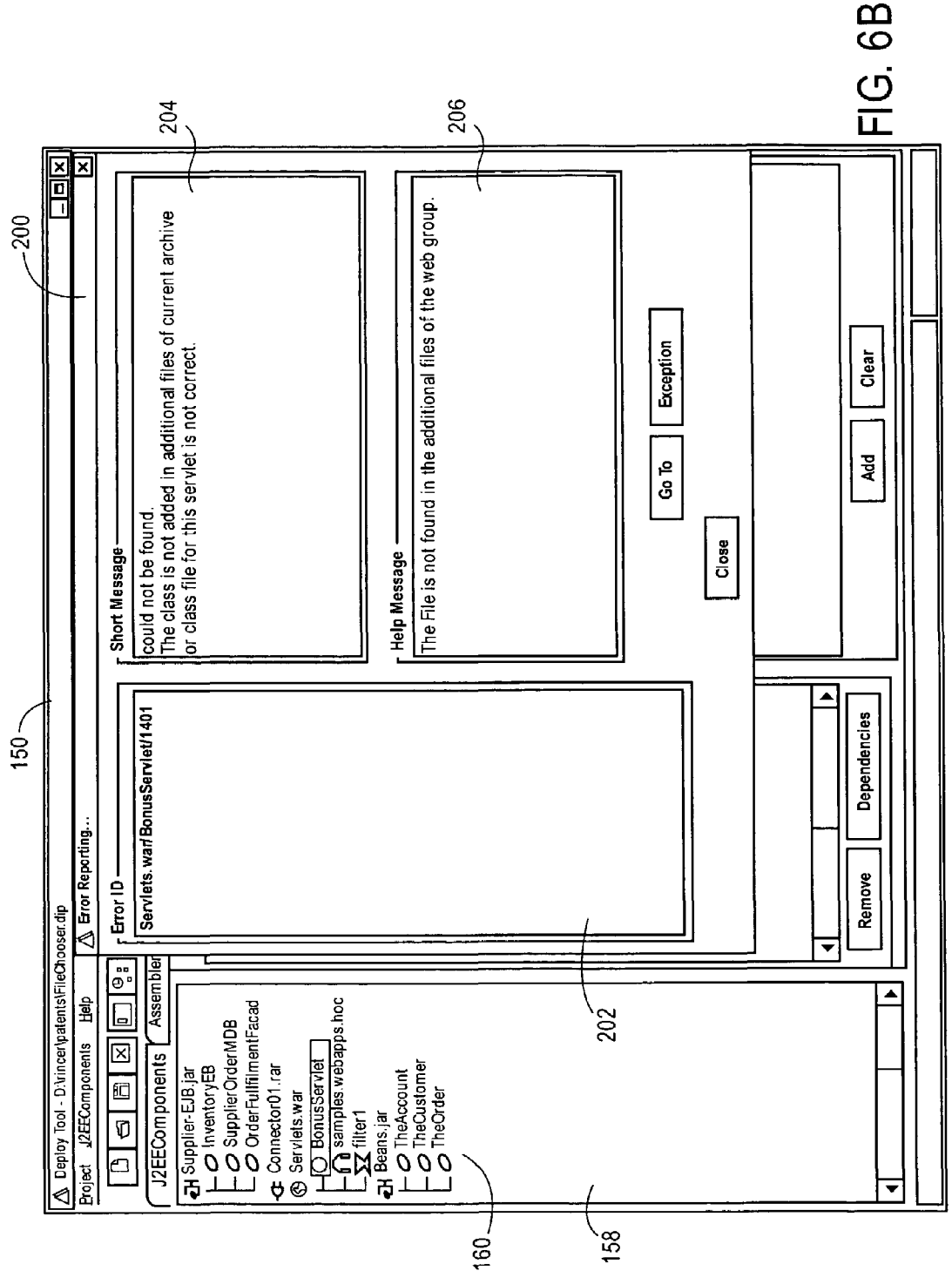
Figure 6C:
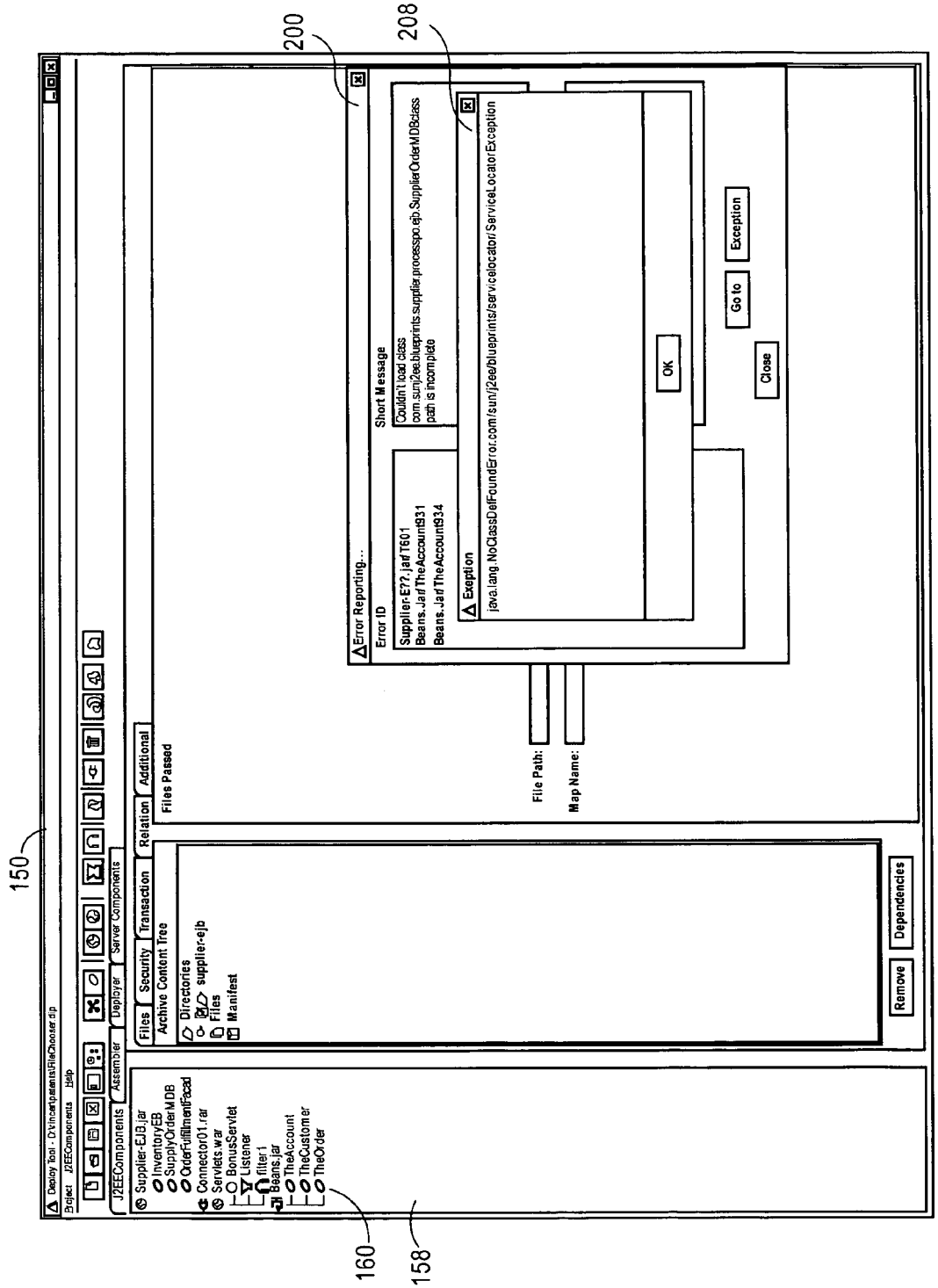

In cases where the selected component can not be located, or a class file associated with the component can not be loaded, or an exception occurs, FIGS. 6A-6C illustrate embodiments of a graphical user interface for displaying error reporting windows. The graphical user interface comprises a first window displaying information specific to a component within a project and a second window displaying information regarding an error related to the component if an error arises with respect to the component (e.g., a class file used to create an instance of the component could not be loaded or an exception arose (e.g., data incompatibility). The second window may comprise a first error window displaying identification of the error, a second error window displaying information regarding the nature of the error, and a third error window displaying information to assist a user in correcting the error. When the error is an exception, the second window may further comprise a fourth error window displaying information regarding the exception.

FIG. 6A illustrates the GUI 150 with The Account bean selected from the components 160 listed in the component window 158, and consequently, the software utilizing the GUI 150 having attempted to load the class files that are utilized by The Account bean. If the selected component can not be located or a class file associated with the selected component can not be loaded, as illustrated in FIG. 6A, an error reporting pop-up window 200 appears within the GUI 150. It should be understood that the error reporting pop-up window 200 may not appear automatically, as the user may open it manually.

The error reporting pop-up window 200 includes an error identification window 202, a short message window 204, and a help message window 206. As illustrated, the error identification window 202 includes a list of "names" of the error, or errors, that the software application utilizing the GUI 150 has detected. If more than one error appears in the error identification window, the user may then select one of the errors within the error identification window 202. In the example illustrated in FIG. 6A, the user has selected the error named "Beans.jar/TheAccount/954."

Once the user has selected the name of one of the errors, further information is displayed in the short message window 204 and the help message window 206. As illustrated, the short message window 204 displays information describing the nature of the error, which in this example, is that the bean class file could not be loaded. The help message window 206 displays information to assist the user in correcting the error.

In an embodiment, because of the nature or severity of the error described in FIG. 6A (i.e., a bean class file could not be located or loaded), the software utilizing the GUI 150 may prevent the user from further deploying an application that includes the component from which the error arises because the application recognizes that the application under development will not work properly with this error when it is constructed or deployed. In order to signify the severity of this error, the name of the selected component may be highlighted in the color red within the component window 158.

FIG. 6B illustrates the GUI 150 with the Servlets.war component selected from the components 160 listed in the component window 158, and consequently, the software application utilizing the GUI 150 having attempted to load the class files associated with the selected component. In an object-oriented component based architectures, servlets may be made of components and also rely on class files. In the example illustrated, the software application was unable to load a class file associated with the BonusServlet servlet within the selected component. As in FIG. 6A, the error reporting pop-up window 200 has appeared within the GUI 150, and further information regarding the name and nature of the error has appeared in the error identification window 202, the short message window 204, and help message window 206.

Again, because of the nature or severity of the error (i.e., a servlet class file could not be loaded), the software application may prevent the user from further deploying an application under construction that uses the servlet because the software application recognizes that the application under development will not work properly with this error. Therefore, as in FIG. 6A, the name of the selected component may be highlighted in red within the component window 158.

FIG. 6C illustrates the GUI 150 with the Supplier.EJB.jar component selected from the components 160 listed in the component window 158. Similarly to FIGS. 6A and 6B, an error, in particular, an "exception," was detected while the data flow of a software application utilizing various components was analyzed. An exception, for example, occurs when a virtual machine experiences a data "catch" in the client's source files, such as a "divide by zero," or a problem with a "try-and-catch block," as is commonly understood in the art.

As illustrated in FIG. 6C, in addition the error reporting window 200, an exception window 208 has appeared within the GUI 150. The exception window displays a name or address of the exception that is being detected.

As previously mentioned, if the error or exception will prevent the application being constructed from working properly (i.e., a first nature or severity), the software application, such as a deployment or development software application, utilizing the GUI 150 may prevent the user from further deployment, and the name of the component in which the error is being detected may be highlighted in red. However, if the nature of the error or exception is such that the application being constructed will work, (e.g., so long as the particular problem class file uses another class file that could be on the server and could be used as a library (i.e., a second nature or severity)), the user may be allowed to further deploy the application. Such a situation may be referred to as a "warning." In such as case, the affected component may be highlighted in the color blue, as opposed to red, within the component window 158.

Processes taught by the discussion above may be performed with program code such as machine-executable instructions, which cause a machine (such as a "virtual machine", general-purpose processor or special-purpose processor) to perform certain functions. Alternatively, these functions may be performed by specific hardware components that contain hardwired logic for performing the functions, or by any combination of programmed computer components and custom hardware components.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

Figure 7:
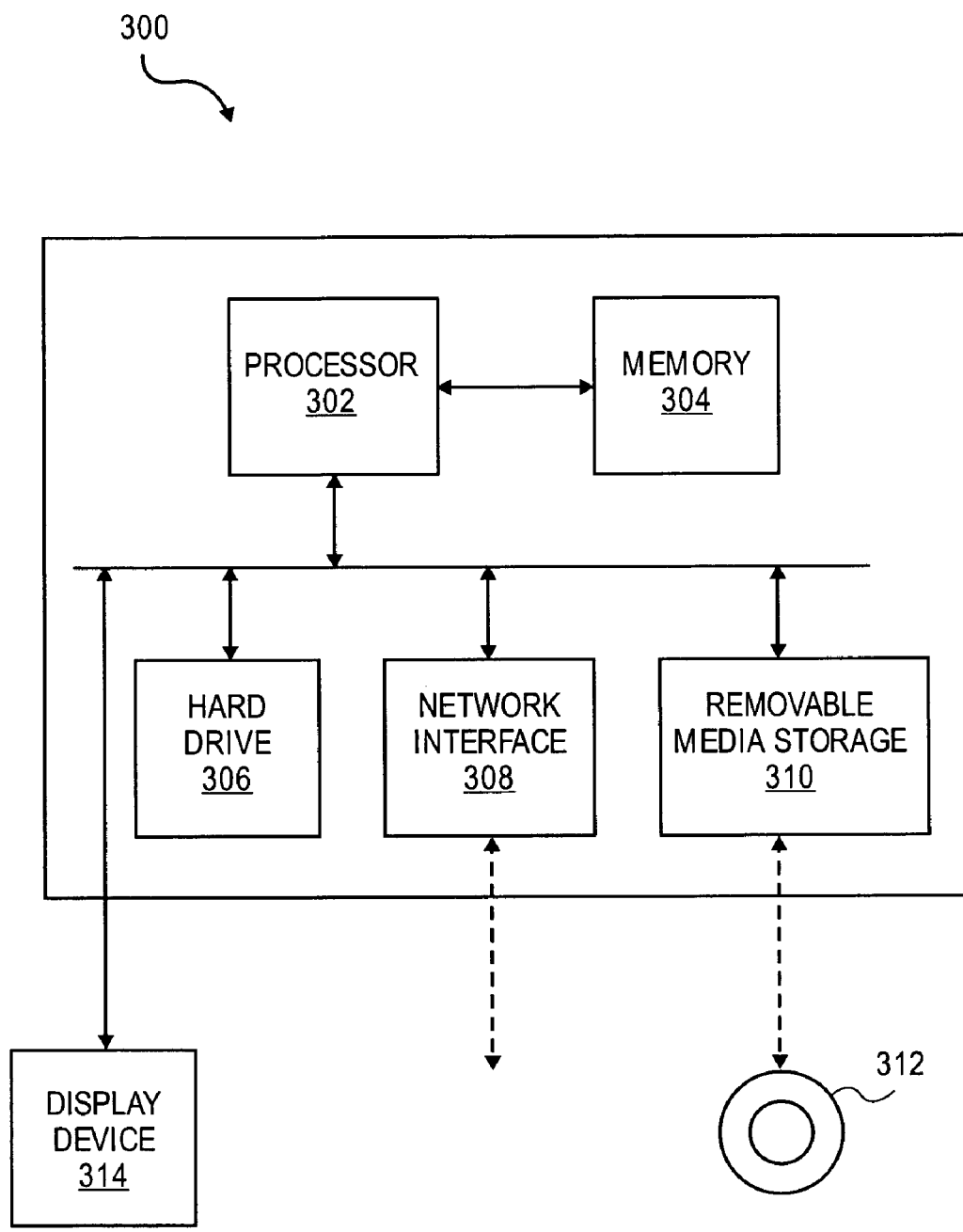
FIG. 7 illustrates a computing system.

FIG. 7 is a block diagram of an example of a computing system 200 that can execute program code stored by an article of manufacture. The computing system 300 includes a processor 302, a memory 304, a hard drive 306, a network interface 308, a removable media drive 310, a CD-ROM 312, and a display device 314. It is important to recognize that the computing system of FIG. 6 is just one of various computing architectures. The applicable article of manufacture may include one or more fixed components (such as a hard disk and a memory) and/or movable components such as a CD-ROM, a compact disc, a magnetic tape, etc. In order to execute program code, typically instructions of the program code are loaded into the memory 304, such as Random Access Memory (RAM), and the processor 302, or microprocessor, then executes the instructions.

The display device 304 may be used to display the GUI described in FIGS. 5A-6C, and the computing system of FIG. 7 may be used to execute instructions in the form of software that may include the GUI and the method for searching for particular types of class files described in FIGS. 2-4. The software may also be used from multiple computing systems simultaneously.

The processes taught by the discussion above can be practiced within various software environments such as, for example, object-oriented and non-object-oriented programming environments, Java based environments (such as a Java 2 Enterprise Edition (J2EE) environment or environments defined by other releases of the Java standard, or other environments (e.g., a .NET environment, a Windows/NT environment, each of which is provided by Microsoft Corporation).

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

The invention claimed is:

1. A graphical user interface comprising:
   a first window displaying features of an application component, wherein the application component is selected for a construction of a software application; and
   a second window displaying information regarding an error related to the application component, said displaying of said second window in response to said error, wherein the error is selected from the group consisting of:
   an error in locating the application component, an error in loading a class file associated with the application component, and an exception.

2. The graphical user interface of claim 1, wherein the second window comprises a first error window displaying an identification of the error related to the application component.

3. The graphical user interface of claim 2, wherein the second window further comprises a second error window displaying information regarding the nature of the error.

4. The graphical user interface of claim 3, wherein the second window further comprises a third error window displaying information to assist a user in correcting the error.

5. The graphical user interface of claim 1, wherein the error is an exception and the second window further comprises a fourth error window displaying information regarding the exception.

6. The graphical user interface of claim 1, wherein a severity of the error is selected from the group consisting of:
   a first severity wherein the software application will not work properly when the software application is constructed; and
   a second severity wherein the software application will work properly when the first software application is constructed.

7. The graphical user interface of claim 6, wherein if the error is of the first severity, deployment of the software application is prevented and if the error is of the second severity, deployment of the software application is permitted.

8. The graphical user interface of claim 7, wherein if the error is of the first severity, a representation of the application component is highlighted in a first color within the first window and if the error is of the second severity, the representation of the application component is highlighted in a second color within the first window.

9. The graphical user interface of claim 8, wherein the first color is red and the second color is blue.

10. The graphical user interface of claim 9, wherein the graphical user interface is part of a deployment software application.

11. An article of manufacture including program code which, when executed by a machine, causes the machine to perform a method, the method comprising displaying a graphical user interface, the graphical user interface comprising:
   a first window displaying features of an application component, wherein the application component is selected for a construction of a software application; and
   a second window displaying information regarding an error related to the application component, said displaying of said second window in response to said error, wherein the error is selected from the group consisting of:
   an error in locating the application component,
   an error in loading a class file associated with the application component, and
   an exception.

12. The article of manufacture of claim 11, wherein the second window comprises a first error window displaying an identification of the error related to the application component.

13. The article of manufacture of claim 12, wherein the second window further comprises a second error window displaying information regarding the nature of the error.

14. The article of manufacture of claim 13, wherein the second window further comprises a third error window displaying information to assist a user in correcting the error.

15. The article of manufacture of claim 11, wherein the error is an exception and the second window further comprises a fourth error window displaying information regarding the exception.

16. The article of manufacture of claim 11, wherein a severity of the error is selected from the group consisting of:
   a first severity wherein the software application will not work properly when the software application is constructed; and
   a second severity wherein the software application will work properly when the software application is constructed.

17. The article of manufacture of claim 16, wherein if the error is of the first severity, deployment of the software application is prevented and if the error is of the second severity, deployment of the software application is permitted.

18. The article of manufacture of claim 17, wherein if the error is of the first severity, a representation of the application component is highlighted in a first color within the first window and if the error is of the second severity, the representation of the application component is highlighted in a second color within the first window.

19. The article of manufacture of claim 18, wherein the first color is red and the second color is blue.

20. The article of manufacture of claim 19, wherein the graphical user interface is part of a deployment software application.

21. A computing system comprising instructions disposed on a computer readable medium, said instructions capable of being executed by said computing system to perform a method, said method comprising displaying a graphical user interface, the graphical user interface comprising:
   a first window displaying features of an application component, wherein the application component is selected for a construction of a software application; and
   a second window displaying information regarding an error related to the application component, said displaying of said second window in response to said error, wherein the error is selected from the group consisting of:
   an error in locating the application component,
   an error in loading a class file associated with the application component, and
   an exception.

22. The computing system of claim 21, wherein the second window comprises a first error window displaying an identification of the error related to the application component.

23. The computing system of claim 22, wherein the second window further comprises a second error window displaying information regarding the nature of the error.

24. The computing system of claim 23, wherein the second window further comprises a third error window displaying information to assist a user in correcting the error.

25. The computing system of claim 21, wherein there error is an exception and the second window further comprises a fourth error window displaying information regarding the exception.

26. The computing system of claim 21, wherein a severity of the error is selected from the group consisting of:
   a first severity wherein the software application will not work properly when the software application is constructed; and a second severity wherein the software application will work properly when the software application is constructed.

27. The computing system of claim 26, wherein if the error is of the first severity, deployment of the software application is prevented and if the error is of the second severity, deployment of the software application is permitted.

28. The computing system of claim 27, wherein if the error is of the first severity, a representation of the application component is highlighted in a first color within the first window and if the error is of the second severity, the representation of the application component is highlighted in a second color within the first window.

29. The computing system of claim 28, wherein the first color is red and the second color is blue.

30. The computing system of claim 29, wherein the graphical user interface is part of a deployment software application.

* * * * *